United States Patent
Feuer et al.

(10) Patent No.: US 9,326,133 B2
(45) Date of Patent: Apr. 26, 2016

(54) SINGLE NUMBER SERVICES FOR FIXED MOBILE TELEPHONY DEVICES

(71) Applicant: Net2Phone, Inc., Newark, NJ (US)

(72) Inventors: David E Feuer, Bergenfield, NJ (US); Joseph Morris, Monsey, NY (US)

(73) Assignee: Net2Phone, Inc., Newark, NJ (US)

( * ) Notice: Subject to any disclaimer, the term of this patent is extended or adjusted under 35 U.S.C. 154(b) by 0 days.

(21) Appl. No.: 14/474,360

(22) Filed: Sep. 2, 2014

(65) Prior Publication Data
US 2015/0056984 A1    Feb. 26, 2015

Related U.S. Application Data

(63) Continuation of application No. 12/208,085, filed on Sep. 10, 2008, now Pat. No. 8,825,058.

(60) Provisional application No. 60/935,975, filed on Sep. 10, 2007.

(51) Int. Cl.
| | |
|---|---|
| H04W 4/00 | (2009.01) |
| H04W 8/26 | (2009.01) |
| H04Q 3/00 | (2006.01) |
| H04W 76/02 | (2009.01) |
| H04M 3/42 | (2006.01) |
| H04M 7/12 | (2006.01) |
| H04W 88/06 | (2009.01) |

(52) U.S. Cl.
CPC .............. *H04W 8/26* (2013.01); *H04M 3/42306* (2013.01); *H04M 7/128* (2013.01); *H04Q 3/0045* (2013.01); *H04W 76/02* (2013.01); *H04W 88/06* (2013.01)

(58) Field of Classification Search
None
See application file for complete search history.

(56) References Cited

U.S. PATENT DOCUMENTS

| | | | | |
|---|---|---|---|---|
| 6,684,072 | B1 * | 1/2004 | Anvekar et al. | 455/432.1 |
| 2007/0015535 | A1 * | 1/2007 | LaBauve et al. | 455/552.1 |

* cited by examiner

*Primary Examiner* — Suhail Khan
(74) *Attorney, Agent, or Firm* — Davidson Berquist Jackson & Gowdey, LLP

(57) ABSTRACT

A special-purpose Service Control Point includes a customized application that provides Fixed Mobile Convergence services and interoperates with a Voice Over Internet Protocol (VoIP) network to achieve a single-number fixed mobile convergence overlay network. By determining if a dual-mode cellular/WiFi handset is reachable via a WiFi network, the Service Control Point may redirect incoming and outgoing calls off of the cellular network and onto the WiFi network, thereby reducing cost and providing greater coverage.

16 Claims, 2 Drawing Sheets

SINGLE NUMBER SERVICES FOR FIXED MOBILE TELEPHONY DEVICES

CROSS REFERENCE TO RELATED APPLICATIONS

The present application claims priority to U.S. patent application Ser. No. 12/208,085, filed Sep. 10, 2008, which claims priority to U.S. Patent Application Ser. No. 60/935,975, filed Sep. 10, 2007, the contents of which are incorporated herein by reference.

FIELD OF INVENTION

The present invention is directed to a method for providing single number services to telephony devices, and in one embodiment to providing such services in a Fixed Mobile Environment.

DISCUSSION OF THE BACKGROUND

Several problems exist with the utilization of separate cellular and Voice-over-IP (VoIP) solutions. First, consumers often are forced to deal with the inconvenience of managing multiple numbers for home, office and travel. Having multiple phone numbers, mailboxes, and places for setting communication preferences can be confusing and require additional effort to make sure that all messages are received and all missed calls are known.

Second, the airtime charges associated with cellular calls can be significant. This is wasteful given that many cellular telephone calls occur from either the office or the home, areas that have an increasing likelihood of being WiFi hotspots. It is especially wasteful in the context of international roaming charges which are frequently more costly than calling within a domestic coverage area.

Third, many cellular companies have coverage problems, especially in rural areas and in buildings, where WiFi is often found. Lastly, current cellular infrastructure requires expensive upgrades to support higher bit rate services and applications that customers want.

Fixed Mobile Convergence (FMC) services is the integration of wireless and wireline technology to create a single converged network that allows wireless users to access services on both wireless and wireline infrastructure through a single handset. There are two basic strategies for implementing FMC, namely Unlicensed Mobile Access (UMA) and IP Multimedia Subsystem (IMS). UMA is considered a simpler gateway-based access convergence implementation, while IMS is a more complex, server-based service convergence implementation. IMS also has much broader goals and is intended for true service convergence across all types of access networks and user device. Hence IMS-based solutions are both complex and expensive for many smaller operators who want FMC but do not want to incur the high cost of deployment.

Both UMA and IMS solutions provide access to various services through Wireless LAN (WLAN-802.11b/g) or WiFi, using special dual-mode handsets. They are intended to provide enhanced cellular coverage in rural and poorly served areas, overcome reception problems within buildings, offer higher data rates and reduce airtime charges by taking advantage of WiFi infrastructure that is ubiquitously deployed in many homes and public places (both for calls within a domestic plan as well as calls that would otherwise be charged at international roaming rates). New dual-mode handsets offered by cell phone makers automatically select between WiFi Mode and Cellular Mode of operation based on network availability. If both networks are available, then WiFi Mode is given preference over Cellular Mode.

To date, implementation trials of FMC have mainly relied on IP Multimedia Subsystem (IMS) standards and architectures. In this respect, IMS is viewed as unifying service delivery architecture for wireline and wireless services.

UMA-based approaches have also been proposed but have required tunneling cellular network signals over WiFi networks. This has several disadvantages. They include that (1) the VoIP network is not leveraged such that traditional Inter-Machine Trunks (IMT) and cell resources are still used and (2) additional value-added services utilizing the available WiFi resources are not provided.

While some of these issues may be addressed to some degree by adding IMS network elements into the core of the cell network, that level of integration is very invasive, and may include modifying data records in the core customer database, the Home Location Registrar (HLR). Those types of modifications can be harmful and error-prone.

BRIEF DESCRIPTION OF THE DRAWINGS

The following description, given with respect to the attached drawings, may be better understood with reference to the non-limiting examples of the drawings, wherein.

DISCUSSION OF THE PREFERRED EMBODIMENTS

Figure 1:
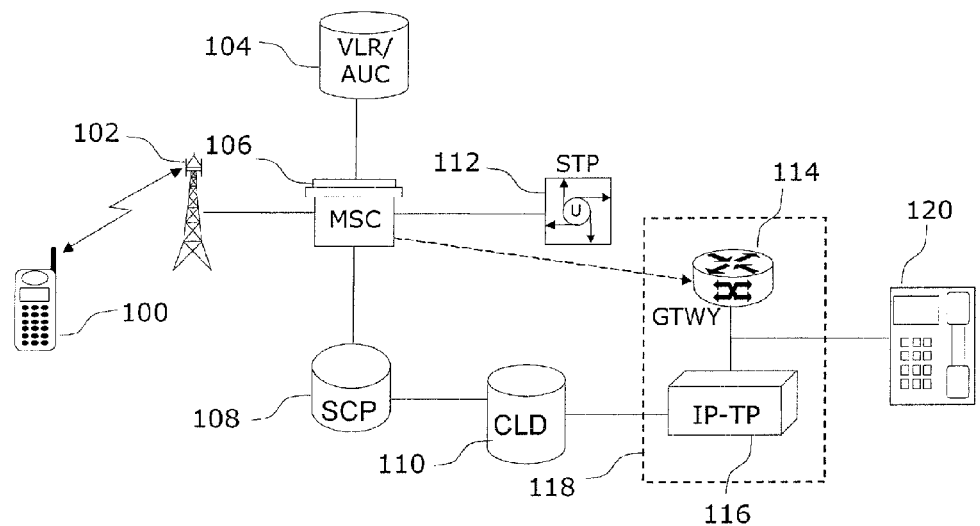
FIG. 1 is a block diagram of a system providing outbound call services from a cell phone to a PSTN phone.

Turning to the drawings, FIG. 1 is a block diagram of a system providing outbound call services from a Dual-Mode WiFi cell phone handset 100 to a PSTN phone 120. The handset 100 utilizes a single number for both its cellular and WiFi based calls, both inbound and outbound.

The system is illustrated as including (1) Base Transceiver Station (BTS)/Base Station Controller (BSC) 102, (2) a Mobile Switching Center 106 with access to a Visitor Location Register (VLR) 104, (3) a Service Control Point (SCP) 108 with access to a Call Log Database (CLD) 110, (4) a Signal Transfer Point (STP) 112, and (5) a telephony interface 118 (including a gateway 114 and an Internet Protocol Telephony Platform (IPTP) 116). The SCP 108 includes a customized application that provides FMC services and interoperates with a Voice Over Internet Protocol (VoIP) network to achieve a single-number fixed mobile convergence overlay network. The application utilizes "peripheral" redirect access to the cellular network, such as would be provided under a Mobile Virtual Network Operator (MVNO) agreement. By providing the services pre-IMS, greater VoIP and cell features can be utilized as well as least cost routing and greater bandwidth and spectrum utilization.

After the Dual-Mode WiFi cell phone handset 100 has entered an area covered by a WiFi router (e.g., at an office, a home, a coffee shop or an Internet café), the handset 100 can register its presence using a standard Session Initiated Protocol (SIP) device registration request. Later, as the handset 100 enters a new area covered by a different WiFi router, it may have to register its presence again using a standard SIP registration request.

Figure 3:
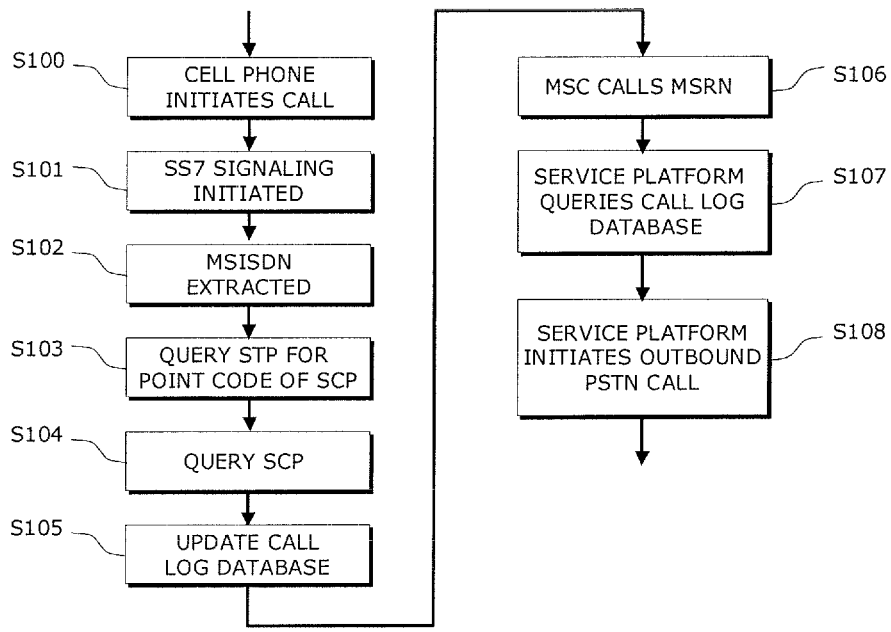
FIG. 3 is a flowchart showing steps involved in providing outbound call services from a cell phone to a PSTN phone.

Later, as shown in steps S100 and S101 of FIG. 3, when the Dual-Mode WiFi cell phone handset 100 attempts to place a call to the PSTN Subscriber 120. When no WiFi network is available, the request is picked up and processed by the serving BTS/BSC 102. The BTS/BSC 102 initiates signaling to its serving Mobile Switching Center (MSC) 106 (e.g., using SS7 signaling protocol). (When a WiFi connection is available, calls can be initiated through a softswitch or a session border controller (SBC) (not shown).)

Upon receipt of a call origination request, MSC 106 extracts the Mobile Station Integrated Services Digital Network Number (MSISDN) associated with the wireless caller's International Mobile Subscriber Identity (IMSI) from the Visitor Location Register (VLR) 104 in step S102.

In step S103, the MSC 106 sends a query (e.g., to the Signal Transfer Point (STP) 112) for the "address" or "point code" of the SCP 108 associated with the IMSI. The MSC 106 also queries the SCP 108 to see if the wireless caller's IMSI reflects a valid subscriber in step 104. The query to the SCP is received at a receiver associated with the SCP 108. The receiver may receive the query via a computer signaling interface (e.g., Ethernet or WiFi) or via a telecommunications signaling interface (e.g., a SS7 interface).

In step S104, if the wireless caller's IMSI matches the information in the SCP 108, then the controller associated with the SCP 108 returns the next available Mobile Station Roaming Number (MSRN) from a pool of available MSRN and passes it back to MSC 106 as part of its response. Such a controller may be implemented in hardware, in software or in a combination of hardware and software.

In order to avoid toll charges when MSC 106 wants to call a MSRN, SCP 108 records the originating E.164 phone number (e.g., 201-406-xxxx) of the request from MSC 106, and retrieves a MSRN (e.g., 201-405-yyyy or 201-406-yyyy) based on the toll locale of the E.164 phone number (e.g., 201-406-xxxx) as published in an IR.21 database (e.g., internal to the SCP 108 or via a query to a remote database). Having received a local telephone number (e.g., 201-405-yyyy or 201-406-yyyy) as a MSRN, MSC 106 will then only be placing a local call (e.g., to 201-405-yyyy or 201-406-yyyy), which will avoid or reduce charges to the owner of SCP 108, as opposed to a regional toll call or long distance call, which would incur an additional charge. In an alternative embodiment, the SCP 108 could return a toll-free number to the MSC to avoid a long distance call (e.g., if a local number was not available in the toll locale of the MSC). In yet another embodiment, the SCP 108 could return a toll-based number to the MSC which has been selected using least cost routing to reduce long distance charges (e.g., if a local and/or toll-free number was not available in the toll locale of the MSC).

The SCP 108 then writes a log of the MSRN, IMSI and Originally Dialed Number (ODN) into the Call Log Database 110 in step S105.

The MSC 106 then places one leg of a call to the assigned MSRN in step S106 by utilizing an outbound connection initiator (e.g., a dialer or a SIP-based connection creator). Additionally in step S106, the Internet Protocol Telephony Platform (IPTP) 116 places the second leg of the call to the ODN through the PSTN and then bridges the two "call legs" together to provide an end-to-end connection.

Accordingly, MSRNs as described above can be used to direct call traffic from the MSC to a specified network (e.g., a VoIP network). As such, instead of an SCP 108 replying to a T-CAP CAMEL query with a CONTINUE message, the SCP 108 returns the number of a gateway to a desired network (such as a VoIP network), which forces the MSC to call the desired network and allows that network to control the call. This enables other features (e.g., Account Balance Announcement, Call recording, transcoding and packetization changes, handoff, etc), to be added to the available calling services and saves money (e.g., by using VoIP calling instead of PSTN calling and/or by using least cost routing). Thus, by using MSRNs as described herein, a VoIP network may appear to the cellular network as a "virtual MSC".

Figure 2:
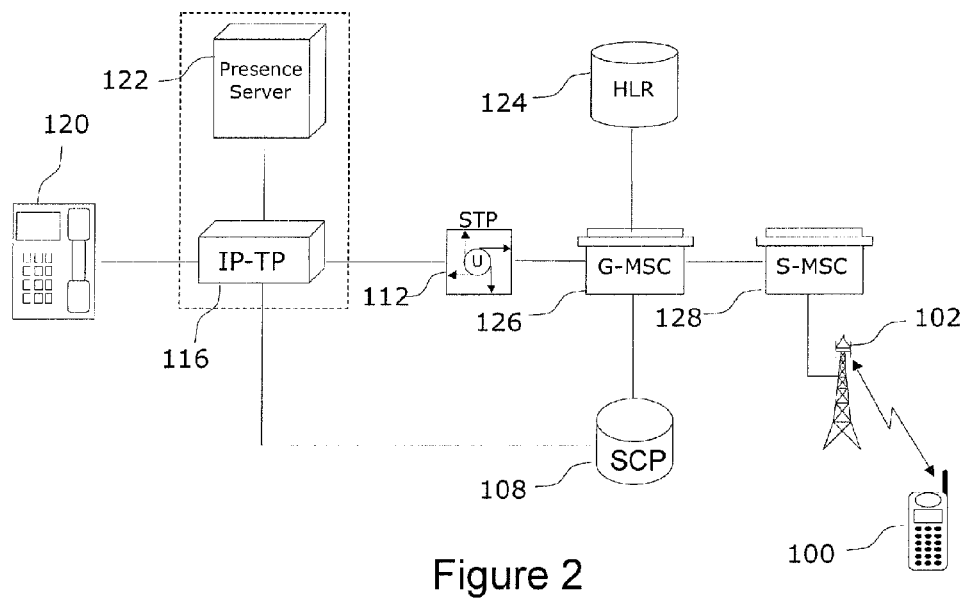
FIG. 2 is a block diagram of a system providing inbound call services to a cell phone from a PSTN phone.

FIG. 2 is a block diagram of a system providing inbound call services to a cell phone from a PSTN phone. The elements of FIG. 2 that are the same or similar to the elements of FIG. 1 are commonly numbered. In addition, FIG. 2 includes a Presence Server (PS) 122 which enables the location of a wireless "convergence subscriber" with a Dual-Mode WiFi handset to be known such that calls can be completed to the handset. Furthermore, FIG. 2 includes a Home Gateway Mobile Switch Center (G-MSC) 126 (with access to a Home Location Register (HLR) 124) and a Serving Mobile Switch Center (S-MSC) 128.

Figure 4:
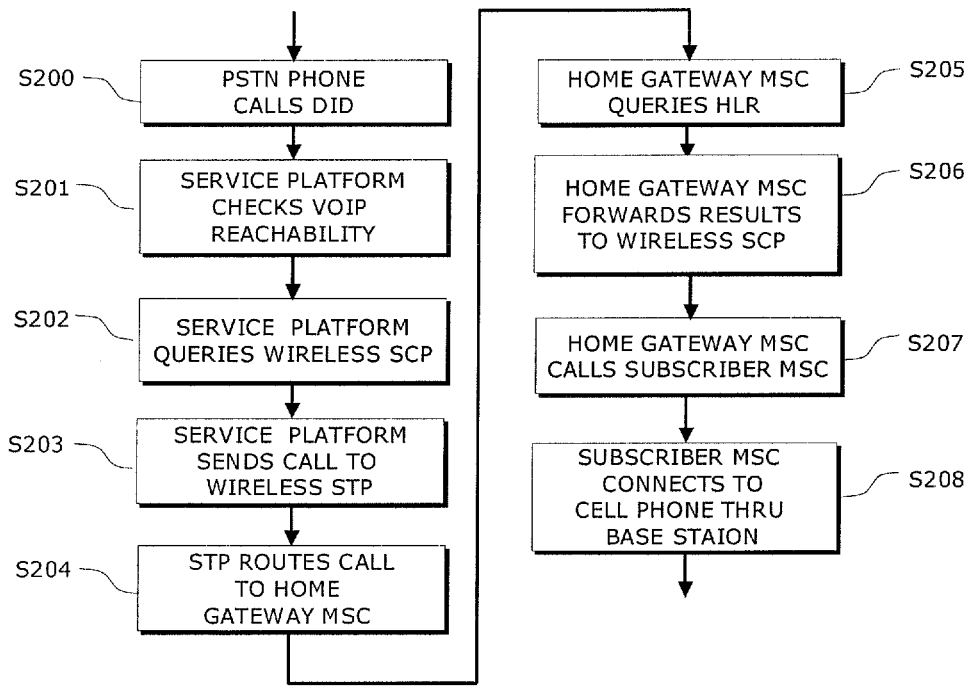
FIG. 4 is a flowchart showing steps involved in providing inbound call services to a cell phone from a PSTN phone.

As shown in step S200 of FIG. 4, a PSTN caller 120 places a call to a registered convergence subscriber with a Dual-Mode WiFi handset 100. The incoming call is received by the service provider Internet Protocol Telephony Platform (IPTP) 116 associated with the number (i.e., the subscriber's regular cellular telephone number) dialed by the PSTN caller 120. The IPTP 116 checks the Presence Server 122 in step S201 to determine if the handset 100 can be reached using VoIP. If the subscriber is logged in through a WiFi connection, then the IP address of the subscriber would already registered with a registration server that is part of the IPTP 116 since the registration information would have been received during normal Session Initiated Protocol (SIP) device registration. Accordingly, a VoIP call between the handset 100 and the PSTN phone 120 can simply be established through the IPTP 116 using standard SIP messaging.

If the subscriber were not logged in through WiFi, call processing would entail call completion through the Cellular network. In this scenario, IPTP 116 performs an insert query by providing the SCP 108 with Automatic Number Identification (ANI), ODN, MSISDN and IMSI information in step S202. The SCP 108 acknowledges receipt of the insert query and provides successful confirmation signal back to IPTP 116 as part of step S202.

Upon receipt of confirmation, IPTP 116 sends call to wireless MSISDN via STP 112 in step 203. The call is routed to the Home Gateway Mobile Switch Center (G-MSC) 126 (e.g., by using STP 112) in step S204, and the Home Location Register (HLR) 124 is queried in step S205 for route information to the Serving Mobile Switch Center (S-MSC) 128.

The HLR 124 returns a Customized Applications for Mobile Networks Enhanced Logic (CAMEL) query through G-MSC 126 to SCP 108 to check if the call came in through the platform as part of step S206 and SCP 108 tells G-MSC 126 to continue if a corresponding call record was found. The G-MSC 126 then proceeds to contact the S-MSC 128 to complete the call in step S207. The S-MSC signals handset 100 through BTS/BSC 102 and completes the call in step S208.

The above-described system provides a cost-effective alternative to IMS-based standards and architectures by utilizing a reduced-complexity FMC service.

Because the SCP enables a single number to reach the handset 100 by either cellular or VoIP communication, a subscriber can receive unified billing and have unified voicemail as well as a unification of any other service (e.g., text messaging). Moreover, by leveraging the WiFi broadband access infrastructure, carriers can enable bandwidth intensive applications such as streaming video without expensive overhaul of their networks.

While the above discussion has focused on WiFi networks (such as those networks that are part of the 802.11 family of protocols), the present invention is not limited to such a wireless network. Instead, the dual-mode handset may utilize any available computer data network (e.g., ZigBee or WiMax).

Furthermore, while the above description has focused on a dual-mode handset, additional numbers of protocols can be supported as well. For example, the handset may include the ability to prioritize between a cellular protocol and two computer data networks (e.g., WiMax and WiFi) such that the SCP first tries to see if the handset is reachable via a preferred network (e.g., WiMax) and if not if it is available via the less preferred network (e.g., WiFi). Only after connections via the data networks had failed would the SCP resort to utilizing cellular services.

Alternatively, if the subscriber knew that he/she would be moving out of WiFi range, he/she could specify a connection network (e.g., cellular or one of the computer data networks) to receive and/or place the call on. In such a case, the bridge could hang-up its attempt to contact the handset 100 over the computer data network (for an outbound or an inbound call) and retry using normal cellular connection procedures.

In an alternative embodiment, the system may further include a Session Border Controller (SBC) for handling packetized voice traffic. In one such embodiment, in step S201, the SBC's database is queried to determine if the handset 100 can be reached using VoIP.

In a further embodiment, the handset 100 may be used for presence detection without being used as the endpoint for an incoming call. For example, if the network determines that the handset 100 is close enough to a network that also includes access to another VoIP device (such as a deskset device), then the handset 100 may direct an incoming call to an available deskset device. That deskset device is preferably a wire-line VoIP device such that the call is routed over a wired connection rather than a wireless connection; however, a wireless deskset device is also possible. The transfer to the deskset device may be made automatically by detecting the location of the user's handset 100, or it may be made manually by specifying on the handset, before the establishment of a call, the name or address of the device to which the call should be routed. The routing may also occur semi-automatically by the handset 100 prompting the user with a list of devices that are in range that the call can be transferred to. The user then simply selects the appropriate device from the list. The list may include only the devices that are not in use or both the devices that are not in use and the devices that are. If a call is routed to an in-use device, then the person already using the phone would hear a call waiting tone. Similarly, the same type of list can be used to transfer an existing call from a handset 100 to a deskset (e.g., that has a speakerphone so that multiple people can participate on a single end of the call which is hard to do with a cell phone). Alternatively, the call may be routed to both the handset and a deskset (or even a landline). In yet another embodiment, the system may "park" the call and notify the user via the handset 100 that a call is waiting and provide a number that the user should call to retrieve the incoming call.

While described above as a handset where the same telephone number is shared between the cellular and WiFi personalities, the handset 100 may also include the ability to set additional WiFi personalities such that a single handset could receive calls to and make calls from the various WiFi personalities (e.g., each with their own caller ID information).

The handset may also be used to override the default WiFi-based calling and use the cellular calling (e.g., when the user knows that he/she is about to leave the WiFi area or the WiFi coverage is intermittent). The handset may further be configured to allow separate calls on each of the interfaces (e.g., putting a VoIP call on hold in order to take an incoming call on the cellular interface or vice versa).

The use of VoIP calls, as described herein, may also provide better audio quality than cellular calls. The cell call media utilizes a compressed format, and VoIP calls over WiFi does not have such a limitation. The calls may be either compressed or uncompressed depending on the implementation. Moreover, with a modified handset, additional compression types may be utilized if/when new compression techniques are to be added/implemented. Furthermore, the handset may change (or "tune") the compression technique being used to better achieve the goals (e.g., bandwidth utilization vs. quality) specified by the telephony company. In addition, use of a Service Control Point for intelligent routing of calls between disparate radio networks is a unique and innovative way to leverage technology that has previously been used for billing implementations.

While certain configurations of structures have been illustrated for the purposes of presenting the basic structures of the present invention, one of ordinary skill in the art will appreciate that other variations are possible which would still fall within the scope of the appended claims.

The invention claimed is:

1. A system for off-loading telephony connections for a multi-mode phone from a cellular network to a computer data network, the system comprising:
    a receiver receiving a request for an outgoing call from the multi-mode phone having an originating phone number;
    a controller for determining, in response to the received request, if the multi-mode phone is reachable via the computer data network; and
    a bridge for bridging a call between the multi-mode phone and a destination of the request for the outgoing call when the multi-mode phone is reachable via the computer data network by (a) receiving at the bridge a telephone number dynamically assigned to the multi-mode phone during call setup, wherein the telephone number dynamically assigned to the multi-mode phone during call setup is different than the originating phone number, (b) establishing a first call from the bridge to the multi-mode phone using the telephone number dynamically assigned to the multi-mode phone during call setup, (c) establishing a second call from the bridge to the destination of the request for the outgoing call, and (d) connecting, by the bridge, the first and second calls, wherein the bridge communicates with the multi-mode phone via the computer data network and the destination of the request for the outgoing call via a public switched telephone network.

2. The system as claimed in claim 1, wherein the multi-mode phone is a dual-mode phone where a first mode is a cellular mode and a second mode is a computer data network mode.

3. The system as claimed in claim 2, wherein the computer data network mode is a WiFi mode.

4. The system as claimed in claim 1, wherein the multi-mode phone is a tri-mode phone where a first mode is a cellular mode and second and third modes are two different computer data network modes.

5. The system as claimed in claim 4, wherein the second mode is a WiFi mode.

6. The system as claimed in claim 1, wherein the request for an outgoing call is received from the cellular network.

7. The system as claimed in claim 1, wherein the bridge comprises an outbound connection initiator for initiating a call to the multi-mode phone using a voice protocol over the computer data network.

8. The system as claimed in claim 1, wherein the telephone number dynamically assigned to the multi-mode phone during call setup comprises a Mobile Station Roaming Number from a pool of available Mobile Station Roaming Numbers.

9. A method for off-loading telephony connections for a multi-mode phone from a cellular network to a computer data network, the method comprising:
  receiving a request for an outgoing call from the multi-mode phone having an originating phone number;
  determining, in response to the request, if the multi-mode phone is reachable via the computer data network; and
  bridging a call between the multi-mode phone and a destination of the request for the outgoing call when the multi-mode phone is reachable via the computer data network, the bridging including (a) receiving at a bridge a telephone number dynamically assigned to the multi-mode phone during call setup, where the telephone number dynamically assigned to the multi-mode phone during call setup is different than the originating phone number, (b) establishing a first call from the bridge to the multi-mode phone using the telephone number dynamically assigned to the multi-mode phone during call setup, (c) establishing a second call from the bridge to the destination of the request for the outgoing call, and (d) connecting the first and second calls using the bridge, wherein the bridge communicates with the multi-mode phone via the computer data network and the destination of the request for the outgoing call via a public switched telephone network.

10. The method as claimed in claim 9, wherein the multi-mode phone is a dual-mode phone where a first mode is a cellular mode and a second mode is a computer data network mode.

11. The method as claimed in claim 10, wherein the computer data network mode is a WiFi mode.

12. The method as claimed in claim 9, wherein the multi-mode phone is a tri-mode phone where a first mode is a cellular mode and second and third modes are two different computer data network modes.

13. The method as claimed in claim 12, wherein the second mode is a WiFi mode.

14. The method as claimed in claim 9, wherein the request for an outgoing call is received from the cellular network.

15. The method as claimed in claim 9, wherein the step of bridging comprises initiating a call to the multi-mode phone from a bridge using a voice protocol over the computer data network.

16. The method as claimed in claim 9, wherein the telephone number dynamically assigned to the multi-mode phone during call setup comprises a Mobile Station Roaming Number from a pool of available Mobile Station Roaming Numbers.

* * * * *